No. 776,734. PATENTED DEC. 6, 1904.
C. E. FULLER.
AX.
APPLICATION FILED APR. 30, 1904.
NO MODEL.
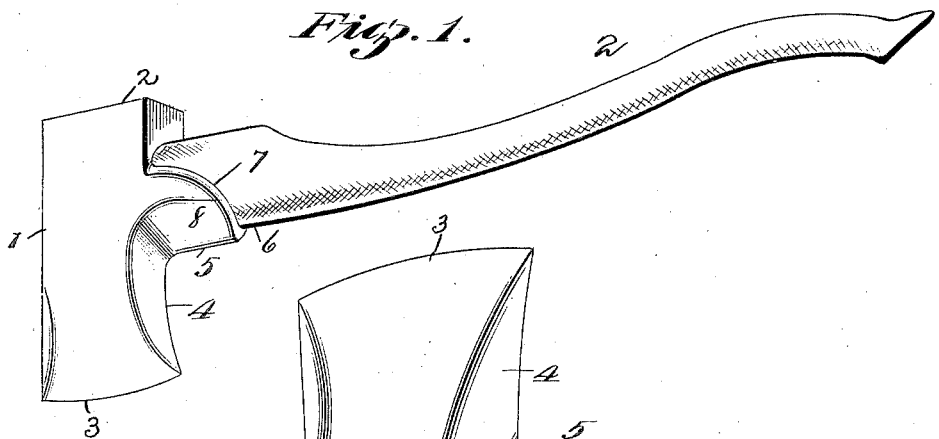
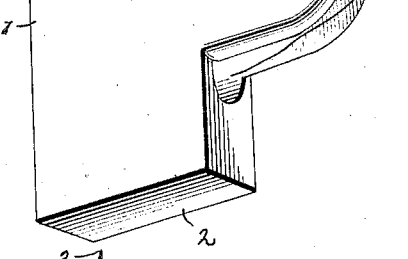
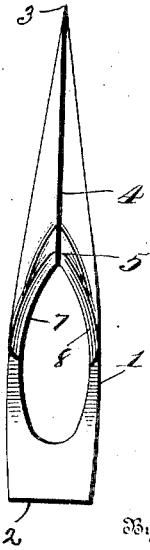
Witnesses
Inventor
Charles E. Fuller,
By
R.S.&A.B. Lacey, Attorneys No. 776,734.

Patented December 6, 1904.

UNITED STATES PATENT OFFICE.

CHARLES E. FULLER, OF MAPLE CITY, KANSAS.

AX.

SPECIFICATION forming part of Letters Patent No. 776,734, dated December 6, 1904.

Application filed April 30, 1904. Serial No. 205,710. (No model.)

*To all whom it may concern:*

Be it known that I, CHARLES E. FULLER, a citizen of the United States, residing at Maple City, in the county of Cowley and State of Kansas, have invented certain new and useful Improvements in Axes, of which the following is a specification.

This invention provides an ax peculiarly adapted to the needs of the woodman, whereby the bark may be more readily stripped, limbs lopped off, and the trunk trimmed in the forest with the greatest ease, despatch, and accuracy.

In accordance with this invention the ax in addition to the usual bit or front edge is formed with a rear cutting edge for special work, as in trimming the trunk after the tree has been felled or for other purpose where a sickle edge is of advantage.

The invention consists of an ax having a cutting edge of approximately sickle form in the rear of its head, a portion of said sickle edge being formed upon a rear extension in line with the lower half of the eye and providing a guard to protect the helve adjacent to the head in the event of overreaching or slipping, which usually results in the force of the blow coming upon the helve next to the head.

The invention will be more particularly described hereinafter, claimed, and illustrated in the accompanying drawings, in which—

Figure 1 is a perspective view of an ax embodying the invention. Fig. 2 is a perspective view of the ax inverted, the helve being omitted. Fig. 3 is a rear view of the ax.

Corresponding and like parts are referred to in the following description and indicated in all the views of the drawings by the same reference characters.

The general outline of the ax is of ordinary appearance. The head 1 is formed with the usual pole 2 and bit 3, the latter constituting the front cutting edge in contradistinction to the rear cutting edge provided in accordance with this invention. The cutting edge arranged in the rear of the head 1 and forming an integral part thereof is approximately of sickle form and comprises the parts 4 and 5, the portion 4 extending lengthwise of the head and the part 5 about in line with the helve 6 or an extension of the eye 7. An extension 8 in the rear of the head 1 and in line with the lower portion of the eye 7 forms a guard or shield to protect the helve 6 immediately in the rear of the ax, and its sides slope rearwardly and downwardly to form the cutting edge 5, constituting a member of the said sickle cutting edge. The rear extension 8 is of such formation as to embrace opposite sides of the helve 6, and its edge portions are beveled to admit of a close joint being formed between the helve and the rear extension 8, whereby shoulders or abrupt projections are obviated. The rear extension 8 prolongs the life of the helve besides rendering the provision of the sickle cutting edge possible. When it is required to strip the bark from the trunk of a tree, lop off limbs, or trim the trunk, the rear or sickle cutting edge is utilized, thereby facilitating the work and enabling the woodman to better control the ax and obviate cutting into the trunk of the tree, which frequently happens in the use of an ax of ordinary formation.

Having thus described the invention, what is claimed as new is—

As a new article of manufacture, an ax having the accustomed bit or front cutting edge and provided in the rear of its bit portion with a cutting edge and having a rear extension in line with the lower portion of the eye to form a shield or guard and having the sides of the rear extension sloped to form a cutting edge which together with the cutting edge in the rear of the bit portion of the head provides a cutting edge of approximately sickle form, the upper and rear edges of said rear extension being beveled inward, substantially as specified.

In testimony whereof I affix my signature in presence of two witnesses.

CHARLES E. FULLER. [L. S.]

Witnesses:
DALLAS CROUSE,
G. E. PURCIVAL.